(12) United States Patent
Koezuka et al.

(10) Patent No.: US 8,519,829 B2
(45) Date of Patent: Aug. 27, 2013

(54) TAG COMMUNICATION APPARATUS, TAG COMMUNICATION APPARATUS CONTROL METHOD, AND TAG COMMUNICATION APPARATUS CONTROL PROGRAM

(75) Inventors: Yahiro Koezuka, Kusatsu (JP); Hirokazu Kasai, Kyoto (JP); Tomonori Ariyoshi, Kusatsu (JP); Arata Kataoka, Kusatsu (JP); Kenta Kawakami, Kusatsu (JP)

(73) Assignee: Omron Corporation, Kyoto (JP)

( * ) Notice: Subject to any disclaimer, the term of this patent is extended or adjusted under 35 U.S.C. 154(b) by 253 days.

(21) Appl. No.: 13/026,766

(22) Filed: Feb. 14, 2011

(65) Prior Publication Data

US 2011/0221571 A1    Sep. 15, 2011

(30) Foreign Application Priority Data

Mar. 15, 2010   (JP) ................. 2010-058547

(51) Int. Cl.
*H03M 7/30*   (2006.01)
(52) U.S. Cl.
USPC ............... 340/10.51; 340/10.1; 341/10.51; 341/170
(58) Field of Classification Search
None
See application file for complete search history.

(56) References Cited

U.S. PATENT DOCUMENTS

| | | | | |
|---|---|---|---|---|
| 4,829,421 A * | 5/1989 | Ritchie | ................. | 709/234 |
| 5,844,508 A | 12/1998 | Murashita et al. | | |
| 7,310,055 B2 * | 12/2007 | Odagiri | ................. | 341/51 |
| 7,532,232 B2 * | 5/2009 | Shah et al. | ................. | 348/14.09 |
| 7,822,944 B2 | 10/2010 | Schuessler | | |
| 7,849,107 B2 | 12/2010 | Schuessler | | |
| 2004/0049733 A1 | 3/2004 | Kerr et al. | | |
| 2007/0108280 A1 * | 5/2007 | Li et al. | ................. | 235/451 |
| 2007/0122941 A1 | 5/2007 | Ota et al. | | |
| 2007/0276984 A1 | 11/2007 | Schuessler | | |
| 2007/0276985 A1 | 11/2007 | Schuessler | | |
| 2008/0316521 A1 * | 12/2008 | Lesage et al. | ................. | 358/1.14 |
| 2009/0153308 A1 * | 6/2009 | Park et al. | ................. | 340/10.51 |
| 2010/0194533 A1 * | 8/2010 | Sullivan et al. | ................. | 340/10.1 |

FOREIGN PATENT DOCUMENTS

| | | |
|---|---|---|
| EP | 1398731 | 3/2004 |
| JP | 09-162748 | 6/1997 |
| JP | 2005-063038 | 3/2005 |
| JP | 2007-94873 | 4/2007 |
| JP | 2007-180598 | 7/2007 |
| JP | 2007-213115 | 8/2007 |
| JP | 2009-15606 | 1/2009 |
| WO | 2007/139969 | 12/2007 |
| WO | WO 2009109797 A1 * | 9/2009 |

OTHER PUBLICATIONS

Extended Search report from E.P.O. in corresponding EP Application 11153764.3, dated May 25, 2011.
Office Action in related Japanese Application No. 2010-058547, along with a partial English language translation, dated Jul. 3, 2012.

* cited by examiner

*Primary Examiner* — Daniel Wu
*Assistant Examiner* — Benyam Haile
(74) *Attorney, Agent, or Firm* — Greenblum & Bernstein, P.L.C.

(57) ABSTRACT

A tag communication apparatus conducts wireless communication with an RFID tag through a radio wave. The tag communication apparatus includes a data receiver that receives transmit data to be transmitted to the RFID tag, a data compressor that compresses at least a part of the transmit data obtained by the data receiver, and outputs the compressed data, and a transmitter that transmits the compressed data, which is compressed and output by the data compressor, to the RFID tag.

7 Claims, 9 Drawing Sheets

TAG COMMUNICATION APPARATUS, TAG COMMUNICATION APPARATUS CONTROL METHOD, AND TAG COMMUNICATION APPARATUS CONTROL PROGRAM

CROSS-REFERENCE TO RELATED APPLICATION

This application claims benefit of priority under 35 U.S.C. §119 to Japanese Patent Application No. P2010-058547 filed on Mar. 15, 2010, which is expressly incorporated herein by reference in its entirety.

BACKGROUND

1. Field of the Disclosure

The present disclosure relates to a tag communication apparatus that conducts communication with an RFID tag through a radio wave, a tag communication apparatus control method, and a tag communication apparatus control program.

2. Background Information

Recently, there is utilized an RFID (Radio Frequency Identification) technology in which a tag communication apparatus that is of a reader/writer conducts wireless communication with an RFID tag (wireless tag). The RFID tag receives attention as replacement of a barcode particularly in the field of logistics, and the RFID tag is expected to become explosively widespread in the near future.

For example, a name, a manufacturing date, various pieces of information depending on the intended use of target goods, and pieces of personal information such as a name and a date of birth are stored in a storage space of the RFID tag.

When the RFID tag becomes widespread to widen a use range of the RFID tag, the information to be stored in the storage space of the RFID tag is expected to be increased, and a demand for increasing a storage capacity of the RFID tag arises.

For example, Japanese Unexamined Patent Publication No. 2007-213115 discloses a technique of storing first information and second information in the RFID tag. Contents of the second information are identical to those of the first information, and the second information is processed in a mode different from that of the first information (for example, compression).

Japanese Unexamined Patent Publication No. 2009-15606 discloses a technique of improving security of information stored in the RFID tag. In the technique of Japanese Unexamined Patent Publication No. 2009-15606, the RFID tag includes a unit that integrates the number of response times to a signal from the tag communication apparatus, the RFID tag does not send back a response when the number of response times reaches a predetermined number of times.

In a technique disclosed in Japanese Unexamined Patent Publication No. 2007-94873, when plural RFID tags exist, information to be stored in a first RFID tag is encrypted by a predetermined key code, and information to be stored in a second RFID tag is encrypted by the information to be stored in the first RFID tag.

When the demand for increasing the storage capacity of the RFID tag arises by the widespread use of the RFID tag, an information amount also increases in communication between the tag communication apparatus and the RFID tag, and unfortunately it takes a long time to conduct the communication.

In the configuration of Japanese Unexamined Patent Publication No. 2007-213115, the first information to be stored in the RFID tag and the second information, in which contents are identical to those of the first information while the second information is processed in the mode different from that of the first information, are transmitted from the tag communication apparatus to the RFID tag. Therefore, even if the first information is compressed to form the second information, the time necessary for the communication is lengthened, and the shortening of the communication time is not achieved.

In the configurations of Japanese Unexamined Patent Publication Nos. 2009-15606 and 2007-94873, only the information to be stored in the RFID tag is transmitted to the RFID tag, and the time necessary for the communication time between the tag communication apparatus and the RFID tag is not shortened.

SUMMARY

A non-limiting feature of the disclosure is to solve the problems described above, and a feature thereof is to implement a tag communication apparatus that can shorten the time necessary for the communication with the RFID tag.

In accordance with one aspect of the present disclosure, a tag communication apparatus is provided that conducts wireless communication with an RFID tag through a radio wave A data receiver obtains transmit data to be transmitted to the RFID tag, a data compressor compresses at least a part of the transmit data obtained by the data receiver and outputs compressed data, and a transmitter transmits the compressed data to the RFID tag.

In accordance with another aspect of the present disclosure, a method is provided for controlling a tag communication apparatus that conducts wireless communication with an RFID tag through a radio wave. The method includes obtaining transmit data to be transmitted to the RFID tag, compressing at least a part of the transmit data obtained in the data obtaining step, outputting the compressed data, and transmitting the compressed data to the RFID tag.

In the configuration and method in accordance with the aspects of the disclosure, at least a part of the transmit data received as the data transmitted to the RFID tag is compressed, and the compressed data that is of the data after the compression for the compressed part is transmitted to the RFID tag. Therefore, the amount of data to be transmitted can be reduced smaller than the data that is not compressed, thus shortening the communication time between the tag communication apparatus and the RFID tag. A larger amount of information can be stored in the RFID tag by the same data amount.

The tag communication apparatus in accordance with an aspect of the disclosure may further include a storage space information generator that generates storage space information in which a storage space in a storage of the RFID tag is correlated with stored information, in which the data receiver receives a plurality of pieces of transmit data, the data compressor compresses the plurality of pieces of transmit data obtained by the data receiver and outputs each piece of compressed data. The space information generator generates compressed data space information associating the each piece of compressed data with the space where the each piece of compressed data is stored in the storage of the RFID tag. The transmitter transmits the each piece of compressed data output from the data compressor and the compressed data space information produced by the storage space information generator to the RFID tag.

In the above-described configuration, the obtained plural pieces of transmit data are compressed, and the compressed data space information about that which compressed data in the plural pieces of compressed data is correlated with the space where the compressed data is stored in the storage of the RFID tag is produced. The plural pieces of compressed data and the compressed data space information are transmitted to the RFID tag.

In the conventional RFID tag, because the table in which the storage space and the stored information are correlated with each other does not exist, only one piece of data can be transmitted. However, in the above-described configuration, the plural pieces of data can be transmitted to the RFID tag because the compressed data space information about that which compressed data is correlated with the space where the compressed data is stored in the storage of the RFID tag is transmitted.

The tag communication apparatus in accordance with an aspect of the disclosure may further include an available space determiner that determines whether an available space exists in the storage of the RFID tag where the each piece of compressed data can be stored and a space shortage information transmitter that transmits space shortage information to a source device indicating a lack of available space for the transmit data obtained by the data receiver when the available space determiner determines that available space does not exist.

In the above-described configuration, when the empty (available) space where the compressed data is stored does not exist in the RFID tag, the space shortage information indicating no empty space is transmitted to the source device of the transmit data. Therefore, the source device can recognize that the empty space where the transmit data is stored does not exist in the RFID tag.

In the tag communication apparatus in accordance with an aspect of the disclosure , in a communication format in which one of a bit information transmission time necessary to transmit pieces of bit information including a data bit string is longer than the other of a bit information transmission time. The data compressor may count the number of appearance times (times of appearance) of bits of the data bit string in the transmit data, and may output (directly) the transmit data when the number of appearance times of a bit having the shorter bit information transmission time is more than that of a bit having the longer bit information transmission time. The data compressor may generate and output converted data in which the bits of the data bit string in the transmit data are replaced with each other (inverted) when the number of appearance times of the bit having the longer bit information transmission time is more than that of the bit having the shorter bit information transmission time.

In the above-described configuration, in the communication format in which one of bit information transmission times necessary to transmit the pieces of bit information constituting the data bit string is longer than the other bit information transmission time, the transmission time of the whole transmit data can be shortened when the bits are replaced with each other (inverted) in the case where the number of appearance times of the bit having the longer bit information transmission time is more than that of the bit having the shorter bit information transmission time. Therefore, the time necessary for the communication between the tag communication apparatus and the RFID tag, that is, the time necessary to transmit the data from the tag communication apparatus to the RFID tag and the time necessary to receive the data from the RFID tag to the tag communication apparatus can be shortened.

The numbers of appearance times of the bits of the data bit string is counted, and the data is converted by the simple process of comparing the numbers of appearance times of the bits to perform the data conversion, so that a processing load can be reduced lighter than the conventional compression method.

In the above-described configuration, because the data is compressed by the unique data compression method, the compressed data cannot be read by another apparatus. Therefore, the data stored in the RFID tag cannot be read by another apparatus, but the safety of the data is improved.

The tag communication apparatus in accordance with an aspect of the disclosure may further include a compressed data receiver that receives the compressed data from the RFID tag , and a data decompressor that decompresses the compressed data received by the compressed data receiver.

In the above-described configuration, because the compressed data transmitted to the RFID tag can be decompressed, contents of the compressed data can be recognized.

The tag communication apparatus in accordance with an aspect of the disclosure may further include a compressed data receiver that receives requested compressed data from the RFID tag and a data decompressor that decompresses the requested compressed data received by the compressed data receiver. The compressed data receiver receives the requested compressed data from the RFID tag using the compressed data space information transmitted from the transmitter to the RFID tag.

In the above-described configuration, the desired compressed data can be obtained and decompressed in the plural pieces of compressed data transmitted to the RFID tag. Therefore, contents of the desired compressed data can be recognized.

The tag communication apparatus may be implemented by a computer. In such cases, the tag communication apparatus is implemented by operating the computer as each unit. Therefore, a control program of the tag communication apparatus in which the tag communication apparatus is implemented by the computer and a computer-readable recording medium in which the control program is recorded are also included in the disclosure. That is, a non-transitory computer readable medium that stores a computer program may be provided that operates a tag communication apparatus to conduct wireless communication with an RFID tag through a radio wave, the program causing the computer to execute receiving transmit data to be transmitted to the RFID tag, compressing at least a part of the transmit data, outputting the compressed data, and transmitting the compressed data to the RFID tag.

As described above, the tag communication apparatus of the disclosure may include a receiver that receives the transmit data transmitted to the RFID tag, a data compressor that compresses at least part of the transmit data obtained by the data receiver and outputs compressed data, and a transmitter that transmits the part of compressed data, which is compressed and output by the data compressor, to the RFID tag.

A method for the tag communication apparatus control includes obtaining the transmit data to be transmitted to the RFID tag, compressing at least part of the transmit data, outputting compressed data, and transmitting the compressed data to the RFID tag.

Therefore, the amount of data to be transmitted is reduced compared with the case where the data is not compressed, so that advantageously the time necessary for the communication between the tag communication apparatus and the RFID tag can be shortened. Additionally, the larger amount of information can advantageously be stored in the RFID tag by the same data amount.

DETAILED DESCRIPTION

Hereinafter, a preferred embodiment of the present disclosure will be described with reference to FIGS. 1 to 11. An RFID reader/writer (tag communication apparatus) 1 according to an embodiment of the disclosure conducts wireless communication with an RFID tag 3 to read and write data.

In the embodiment, when the RFID reader/writer 1 conducts wireless communication with the RFID tag 3, the data is transmitted to the RFID tag 3 while compressed, whereby an information amount of the transmit data is reduced to achieve shortening of a transmission time.

Because the compressed data is written in the RFID tag 3, it is necessary to perform decoding compatible with a compression format in order to read the data written in the RFID tag 3. Therefore, security of the data written in the RFID tag 3 is improved.

Figure 2A:
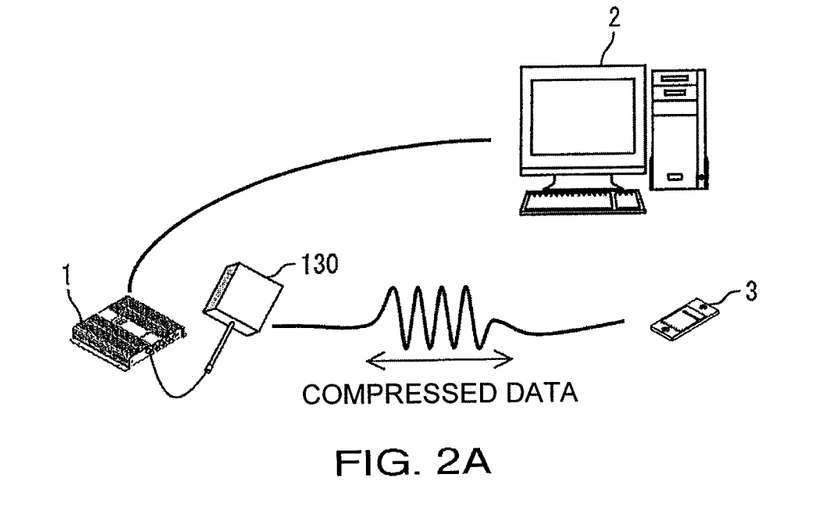
FIG. 2A is a view illustrating a configuration of the RFID reader/writer of the embodiment.
Figure 2B:
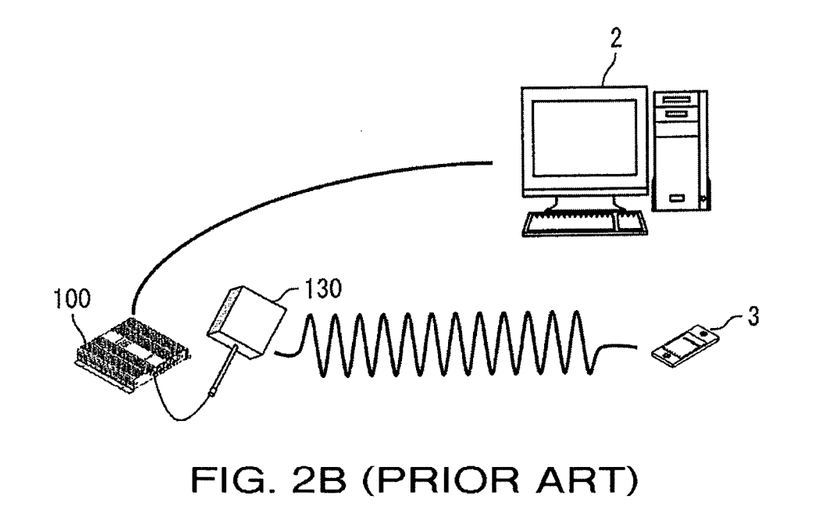
FIG. 2B is a view illustrating a configuration of a conventional RFID reader/writer.

A configuration of the embodiment will specifically be described with reference to FIG. 2. FIG. 2A is a view illustrating a configuration of the RFID reader/writer 1 of the embodiment, and FIG. 2B is a view illustrating a configuration of a conventional RFID reader/writer. As illustrated in FIG. 2A, when the RFID reader/writer 1 receives the data to be written in the RFID tag 3 from a Personal Computer (PC) 2 that is of a high-order instrument, the RFID reader/writer 1 compresses the received data to convert the data into a format suitable to the transmission, and the RFID reader/writer 1 transmits the data to the RFID tag 3 through an antenna 130.

On the other hand, in the conventional configuration, as illustrated in FIG. 2B, an RFID reader/writer 100 directly converts data, which is received from the PC 2 and written in the RFID tag 3, into a format suitable to the transmission to transmit the data to the RFID tag 3 through the antenna 130.

Therefore, in the embodiment, the data transmitted from the RFID reader/writer 1 to the RFID tag 3 is compressed, so that the amount of data to be transmitted can be reduced to shorten the transmission time.

Figure 1:
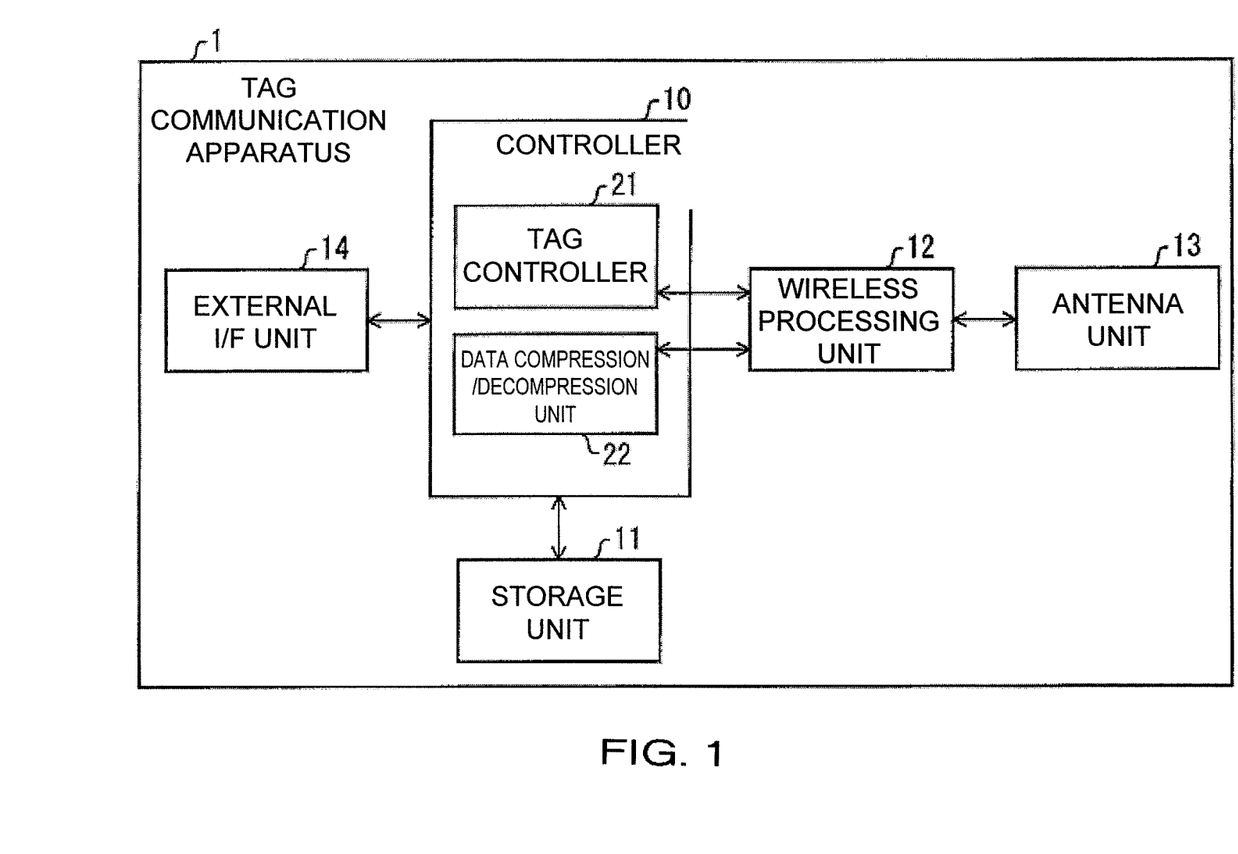
FIG. 1 is a block diagram illustrating a configuration of a main part of an RFID reader/writer according to an embodiment of the disclosure.

The RFID reader/writer 1 of the embodiment will be described with reference to FIG. 1. As illustrated in FIG. 1, the RFID reader/writer 1 includes a controller 10, a storage unit 11, a wireless processing unit (transmission unit) 12, an antenna unit 13, and an external I/F unit (data obtaining unit) 14.

The controller 10 totally controls an operation of the RFID reader/writer 1. The controller 10 includes a PC-based computer. The operation of the RFID reader/writer 1 is controlled by causing the computer to execute a control program. For example, the program recorded in a removable media such as a CD-ROM may be read in and executed by the computer, or the program installed in a hard disk may be read in and executed by the computer. Alternatively, the program is down-loaded through the external I/F unit 14 and installed in the hard disk, and the program may be read in and executed by the computer.

The controller 10 also includes a tag controller (space information producing unit, empty space determining unit, space shortage information transmission unit) 21 and a data compression/decompression unit (data compression unit, data decompression unit, compressed data obtaining unit) 22. The tag controller 21 transmits a predetermined command to the RFID tag 3 through the wireless processing unit 12 and the antenna unit 13 and processes a command received from the RFID tag 3.

More particularly, when the external I/F unit 14 receives the data to be written in the RFID tag 3, the tag controller 21 makes a request for the RFID tag 3 to transmit file data. When obtaining the file data from the RFID tag 3, the tag controller 21 computes an address map from the file data to determine whether the data can be written in the RFID tag 3. When the data can be written in the RFID tag 3, the tag controller 21 produces file information (space information and compressed data space information) that is of data to be written in a file table area 505 with respect to the data to be written in the RFID tag 3, and the tag controller 21 transmits the file information to the RFID tag 3. When the data cannot be written in the RFID tag 3, the tag controller 21 transmits data (space shortage information) indicating that the RFID tag 3 has no space where the data is written to a high-order instrument (source device) of the RFID reader/writer 1 through the external I/F unit 14. The high-order instrument is a source of the data to be written in the RFID tag 3.

As used herein, the file data means data in which a storage space and stored information are correlated with each other in a memory 35 of the RFID tag 3. The RFID reader/writer 1 can write plural pieces of data in the RFID tag 3 by producing the file data.

The data compression/decompression unit 22 compresses the data, which is obtained through the external I/F unit 14 and written in the RFID tag 3. The data compression/decompression unit 22 computes a data length of the compressed data that is of the data after the compression, and the data compression/decompression unit 22 transmits the compressed data and the data length of the data to the wireless processing unit 12. The detailed data compression is described later. The data compression/decompression unit 22 obtains the compressed data, transmitted from the RFID tag 3 through the antenna unit 13 and the wireless processing unit 12, and decompresses the compressed data. When plural pieces of compressed data are written in the RFID tag 3, the data compression/decompression unit 22 computes a storage space for the desired compressed data from the file data, obtains the compressed data written in the storage space, and decompresses the compressed data.

The storage unit 11 includes a nonvolatile storage device such as the hard disk. Examples of contents stored in the storage unit 11 include the control program, an OS (operating system) program, various programs and various pieces of data.

The wireless processing unit 12 converts the data, received from the controller 10, into a format suitable to wireless transmission to transmit the converted wireless signal to the outside through the antenna unit 13. The wireless processing unit 12 also converts the wireless signal, received from the outside through the antenna unit13, into the original format to transmit the converted data to the controller 10. The wireless processing unit 12 includes an A/D (Analog-to-Digital) conversion circuit, a D/A (Digital-to-Analog) conversion circuit, a modulation/demodulation circuit, and an RF circuit.

The antenna unit 13 transmits the wireless signal from the wireless processing unit 12 to the outside in the form of a radio wave, and the antenna unit 13 converts the radio wave received from the outside into the wireless signal to transmit the wireless signal to the wireless processing unit 12. The antenna unit 13 includes the antenna 130 and an oscillation circuit.

The external I/F unit 14 conducts communication with the external device such as the PC. USB (Universal Serial Bus), IEEE1394, and Ethernet (registered trademark) can be cited as an example of an interface standard of the external I/F unit 14.

A configuration of the RFID tag 3 will be described with reference to FIG. 3. The usual RFID tag does not include a power supply such as a battery, but a circuit is operated by an electric power transmitted from the RFID reader/writer in the form of the radio wave, whereby the RFID tag conducts wireless communication with the RFID reader/writer.

Figure 3:
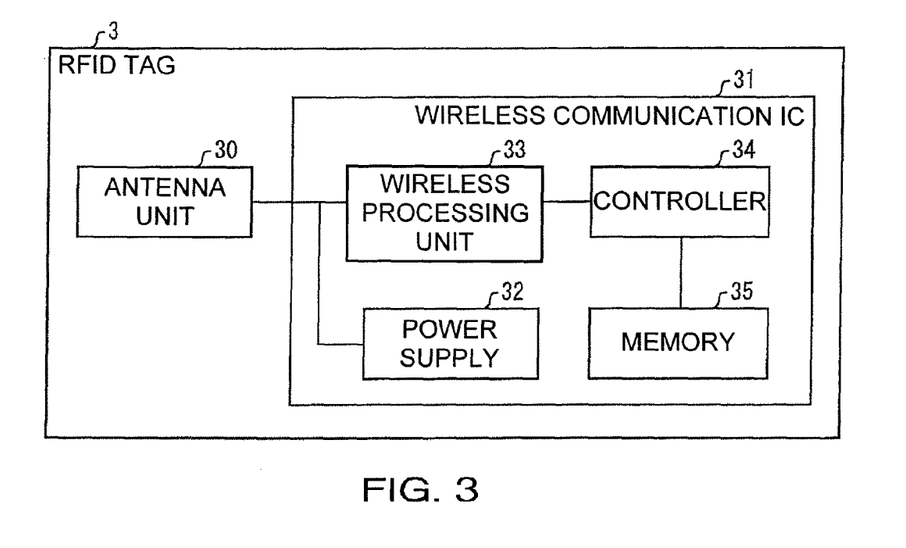
FIG. 3 is a block diagram illustrating a configuration of a main part of an RFID tag according to an embodiment of the disclosure.

As illustrated in FIG. 3, the RFID tag 3 includes an antenna unit 30 and a wireless communication IC 31.

The antenna unit 30 receives the radio wave from the RFID reader/writer 1 as a power source used to operate the wireless communication IC 31. The antenna unit 30 converts the radio wave received from the RFID reader/writer 1 into the wireless signal to transmit the wireless signal to the wireless communication IC 31, and the antenna unit 30 converts the wireless signal from the wireless communication IC 31 into the radio wave to transmit the radio wave to the RFID reader/writer 1. The antenna unit 30 includes an antenna and an oscillation circuit.

Based on the signal received from the RFID reader/writer 1 through the antenna unit 30, the wireless communication IC 31 stores the data from the RFID reader/writer 1 or transmits the stored data to the RFID reader/writer 1 through the antenna unit 30. As illustrated in FIG. 3, the wireless communication IC 31 includes a power supply unit 32, a wireless processing unit 33, a controller 34, and a memory 35.

In the power supply unit 32, a rectifying circuit rectifies an inductive voltage, which is generated by the antenna unit 30 receiving the radio wave, a power supply circuit adjusts the generated voltage to a predetermined voltage, and then the voltage is supplied to each unit of the wireless communication IC 31. The power supply unit 32 includes a bridge diode and a voltage adjusting capacitor.

The wireless processing unit 33 converts the wireless signal received from the outside through the antenna unit 30 into the original format to transmit the converted data to the controller 34, and the wireless processing unit 33 converts the data received from the controller 34 into the format suitable to the wireless transmission to transmit the converted wireless signal to the outside through the antenna unit 30. The wireless processing unit 33 includes an A/D (Analog-to-Digital) conversion circuit, a D/A (Digital-to-Analog) conversion circuit, a modulation/demodulation circuit, and an RF circuit.

The controller 34 totally controls an operation of the wireless communication IC 31. The controller 34 includes a logic operation circuit and a register, and the controller 34 acts as a computer. The operation is controlled by causing the computer to execute a control program. For example, the program installed in the memory 35 such as a ROM (Read Only Memory) may be read in and executed by the computer. Alternatively, the program is down-loaded from the RFID reader/writer 1 through the antenna unit 30 and the wireless processing unit 33 and installed in the memory 35, and the program may be read in and executed by the computer.

Based on the data received from the RFID reader/writer 1 through the antenna unit 30 and the wireless processing unit 33, the controller 34 stores the data from the RFID reader/writer 1 in the memory 35, and reads the data stored in the memory 35 to transmit the data to the RFID reader/writer 1 through the wireless processing unit 33 and the antenna unit 30.

The memory 35 includes a semiconductor memory such as the ROM, an SRAM (Static RAM), and an FeRAM (ferroelectric memory). Examples of contents stored in the memory 35 include the above described control program, various programs, and various pieces of data. Desirably a nonvolatile memory such as the ROM and a low-power-consumption memory such as the SRAM and the FeRAM are used, because the radio wave transmitted from the RFID reader/writer 1 is used as the power source in the wireless communication IC 31.

Figure 4:
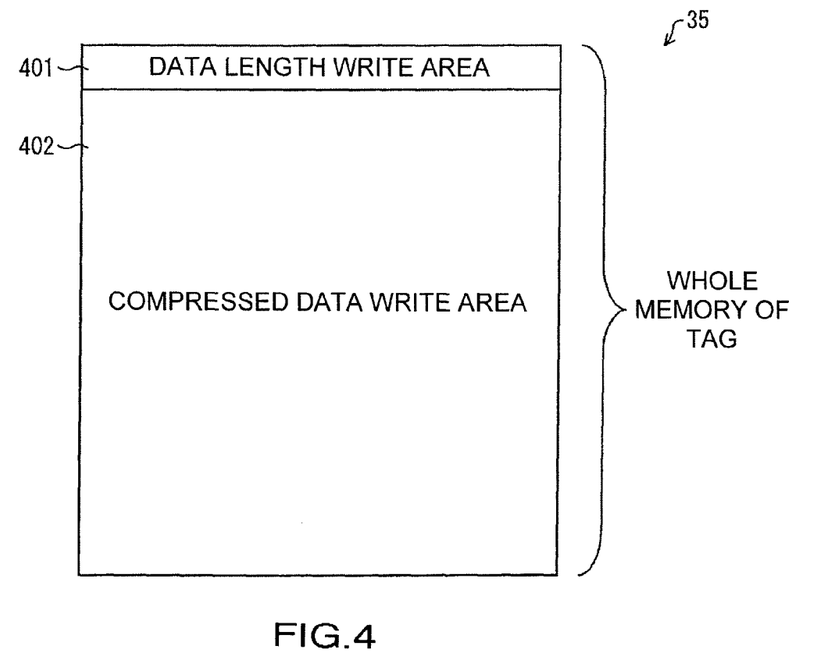
FIG. 4 is a view illustrating a configuration of a memory of the RFID tag of the embodiment.

A structure of the memory 35 of the RFID tag 3 will be described below with reference to FIG. 4 and FIG. 5. FIG. 4 illustrates a structure of the memory 35 when one kind of the data is stored, and FIG. 5 illustrates a structure of the memory 35 when plural kinds of the pieces of data are stored.

As illustrated in FIG. 4, when the one kind of the data is stored (written) in the memory 35, the memory 35 has a structure including a data length write area 401 in which a data length of the stored data is written and a compressed data write area 402 in which the compressed data is written. Because the data to be written is compressed, the data length of the data to be written becomes variable. Therefore, possibly the compressed data cannot be read unless the data length of the compressed data is written.

Figure 5:
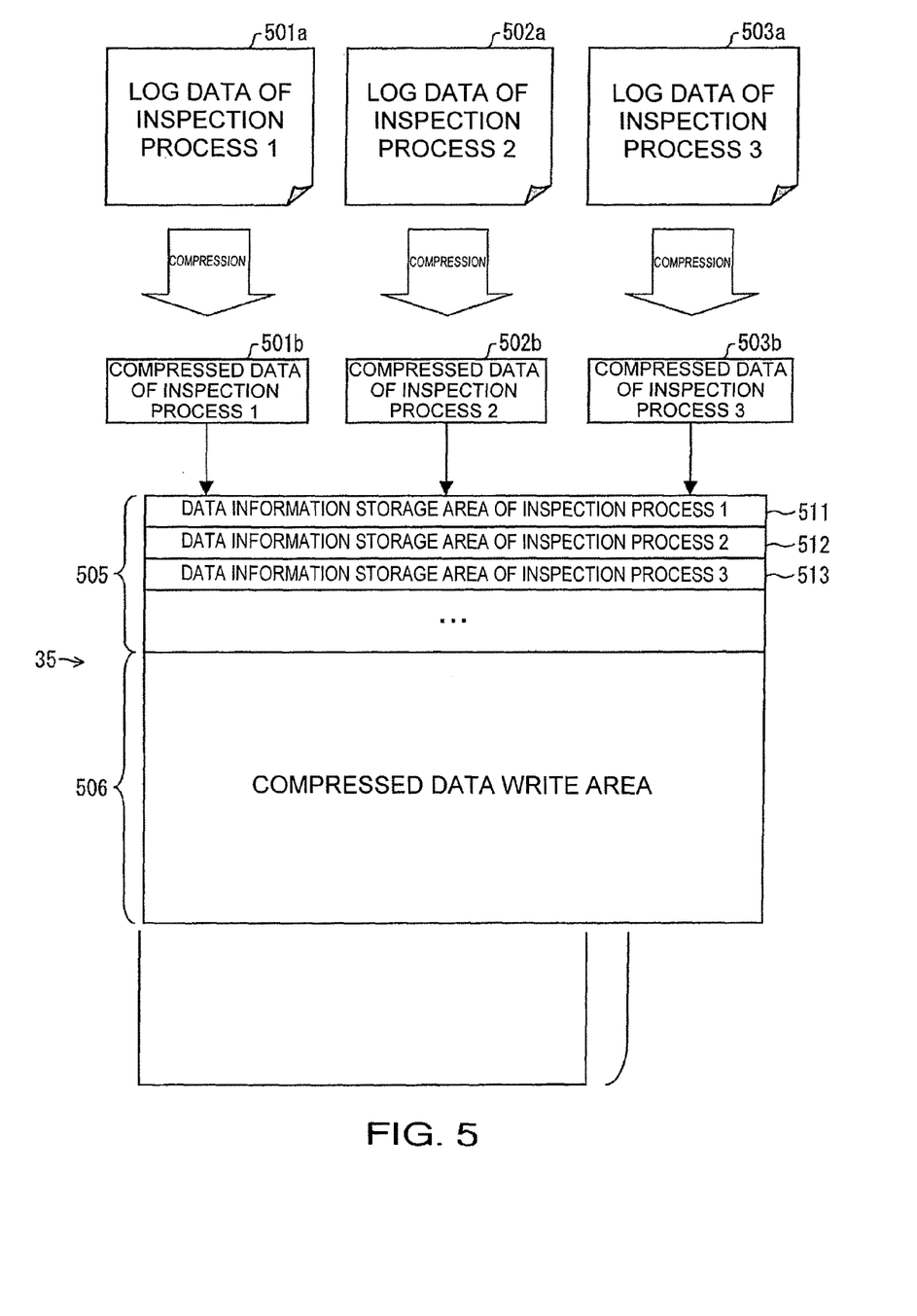
FIG. 5 is a view illustrating a configuration of a memory of the RFID tag of the embodiment.

As illustrated in FIG. 5, when the plural kinds of the pieces of data are stored in the memory 35, the memory 35 has a structure including a file table area 505 in which a file name, a file size, and a file storage starting address of each of the pieces of data to be written are written and a compressed data write area 506 in which the compressed data is written. This is because, when the plural kinds of the pieces of data are stored, the data cannot be read unless information indicating where the data is written exists.

FIG. 5 illustrates an example in which log data 501a of an inspection process 1, log data 502a of an inspection process 2, and log data 503a of an inspection process 3 are written in the RFID tag 3 as the plural kinds of the pieces of data. As illustrated in FIG. 5, when the pieces of data are stored in the RFID tag 3, the pieces of data are compressed to produce pieces of file information indicating file names, file sizes, and file storage starting addresses of compressed data 501b of the inspection process 1, compressed data 502b of the inspection process 2, and compressed data 503b of the inspection process 3. The file storage starting address is used when the compressed data is written in the compressed data write area 506. Then the produced pieces of file information are written in the file table area 505 of the memory 35.

Specifically, the file name, file size, and file storage starting address, used in writing the compressed data in the compressed data write area 506, of the compressed data 501b of the inspection process 1 are written in a data information storage area 511 of the inspection process 1 in the file table area 505. Similarly, the file name, file size, and file storage starting address, used in writing the compressed data in the compressed data write area 506, of the compressed data 502b of the inspection process 2 are written in a data information storage area 512 of the inspection process 2 in the file table area 505. Similarly, the file name, file size, and file storage starting address, used in writing the compressed data in the compressed data write area 506, of the compressed data 503b of the inspection process 3 are written in a data information storage area 513 of the inspection process 3 in the file table area 505.

The compressed data 501b of the inspection process 1, the compressed data 502b of the inspection process 2, and the compressed data 503b of the inspection process 3 are written in position, indicated by the file storage starting addresses thereof, in the compressed data write area 506.

Figure 6:
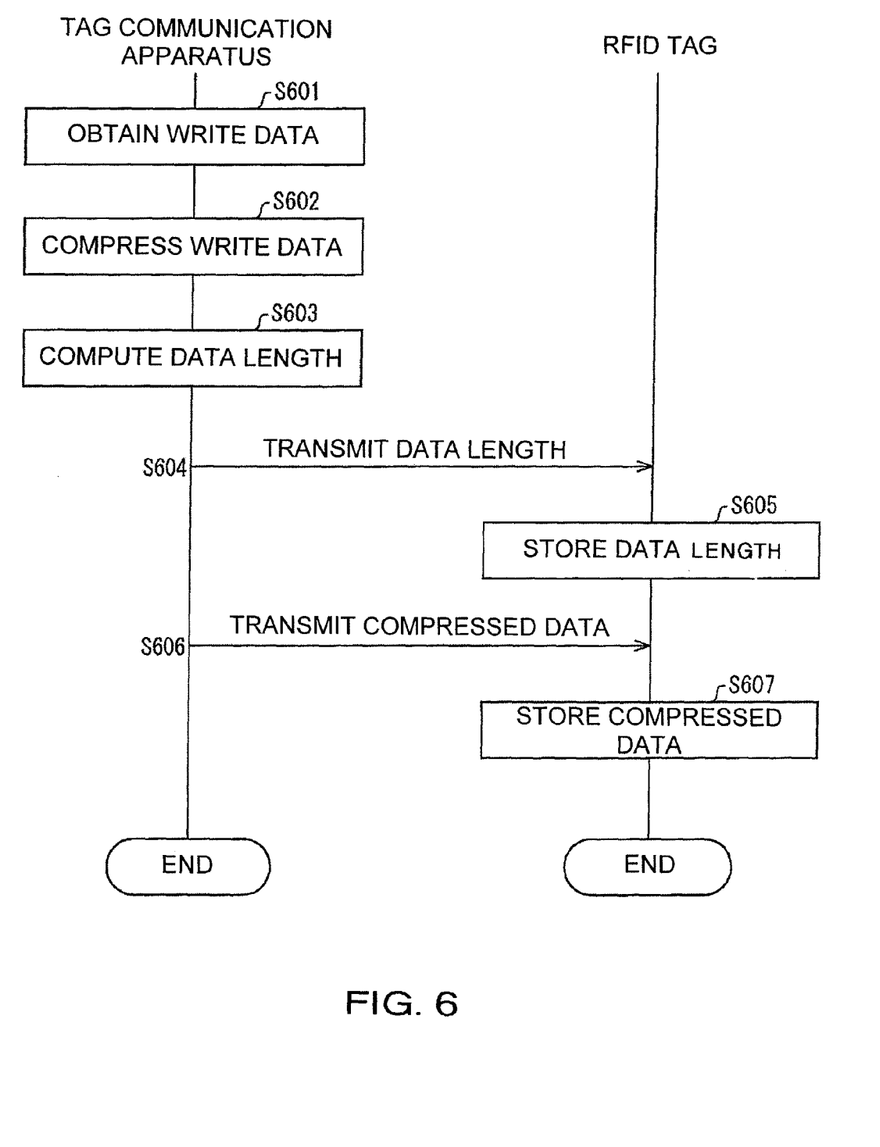
FIG. 6 is a sequence diagram illustrating a processing flow of the embodiment.

A processing flow of the embodiment will be described below with reference to FIG. 6 and FIG. 7. FIG. 6 illustrates a processing flow when the one kind of the data is written in the RFID tag 3, and FIG. 7 illustrates a processing flow when the plural kinds of the pieces of data are written in the RFID tag 3.

As illustrated in FIG. 6, when the one kind of the data is written in the RFID tag 3, the external I/F unit 14 of the RFID reader/writer 1 obtains the data to be written in the RFID tag 3 from the high-order instrument (data obtaining step in S601). The data compression/decompression unit 22 compresses the data obtained by the external I/F unit 14 (data compression step in S602). The data compression/decompression unit 22 computes the data length of the compressed data that is of the data after the compression (S603). The computed data length is transmitted to the RFID tag 3 through the wireless processing unit 12 and the antenna unit 13 (transmission step in S604). The RFID tag 3 writes the received data length in the memory 35 (S605). The RFID reader/writer 1 transmits the compressed data compressed by the data compression/decompression unit 22 to the RFID tag 3 (S606). When receiving the compressed data, the RFID tag 3 writes the compressed data in the compressed data write area 402 of the memory 35 (S607). Therefore, the processing of writing the one kind of the data to be written in the RFID tag 3 is ended.

The processing flow in writing the plural kinds of the pieces of data in the RFID tag 3 will be described below with reference to FIG. 7.

Figure 7:
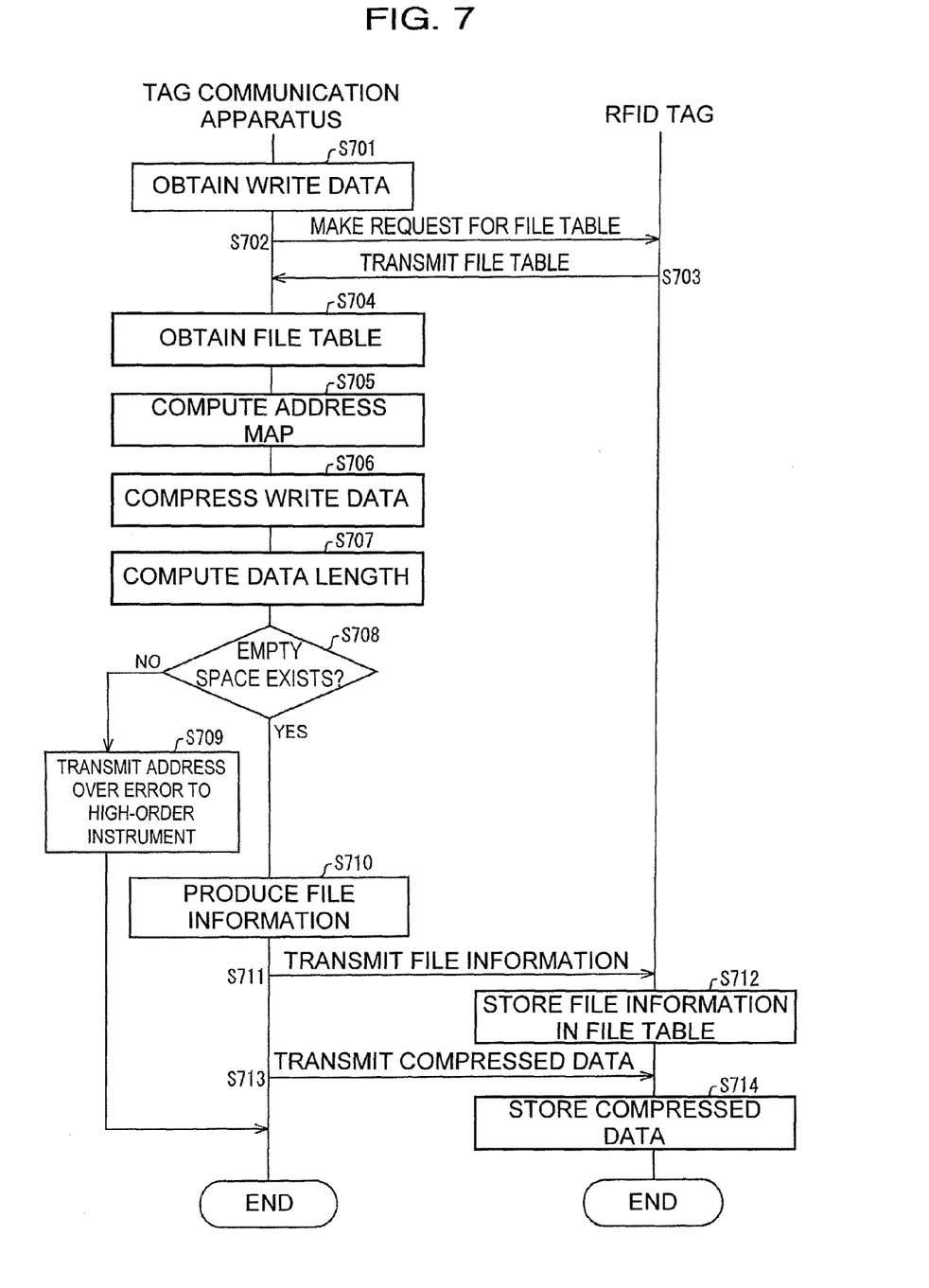
FIG. 7 is a sequence diagram illustrating a processing flow of the embodiment.

As illustrated in FIG. 7, the external I/F unit 14 of the RFID reader/writer 1 obtains the plural kinds of the pieces of data to be written in the RFID tag 3 (S701). The tag controller 21 makes a request for the RFID tag 3 to transmit the file table (S702). The RFID tag 3 transmits the file table to the RFID reader/writer 1 in response to the request (S703). When obtaining the file table (S704), the tag controller 21 computes the address map indicating the position where the data is written in the memory 35 (S705).

The data compression/decompression unit 22 compresses the plural kinds of the pieces of data obtained by the external I/F unit 14 (S706), and the data compression/decompression unit 22 computes the data length of each of the pieces of data that are of the pieces of data after the compression (S707). The tag controller 21 determines whether the compressed data can be written in the memory 35 from the computed address map and data length (S708). When determining that the compressed data can be written in the memory 35 (YES in S708), the tag controller 21 produces the file information that is of the data written in the file table area 505 of the memory 35 (S710). The tag controller 21 transmits the produced file information to the RFID tag 3 (S711). The RFID tag 3 writes the received file information in file table area 505 of the memory 35 (S712). The RFID reader/writer 1 transmits the pieces of compressed data to the RFID tag 3 (S713). The RFID tag 3 writes the received pieces of compressed data to the compressed data write area 506 of the memory 35 (S714).

On the other hand, when determining that the compressed data cannot be written in the memory 35 (NO in S708), the tag controller 21 transmits an address over error indicating that the compressed data cannot be written in the RFID tag 3 to the high-order instrument, which is of the source of the data to be written in the RFID tag 3, through the external I/F unit 14 (S709). Therefore, the processing of writing the plural kinds of the pieces of data to be written in the RFID tag 3 is ended.

Figure 8:
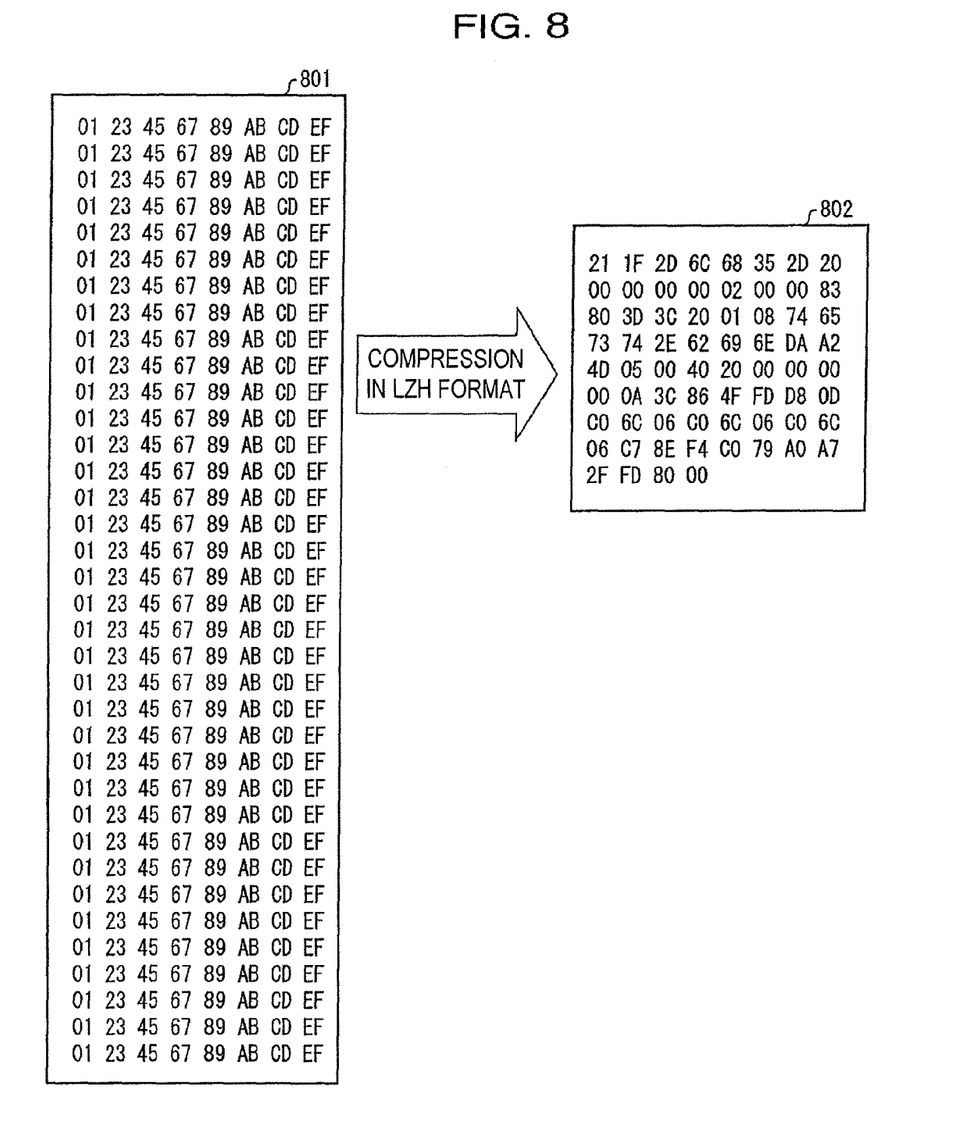
FIG. 8 is an explanatory view of data compression in a data compression/decompression unit of the RFID reader/writer of the embodiment.
Figure 10:
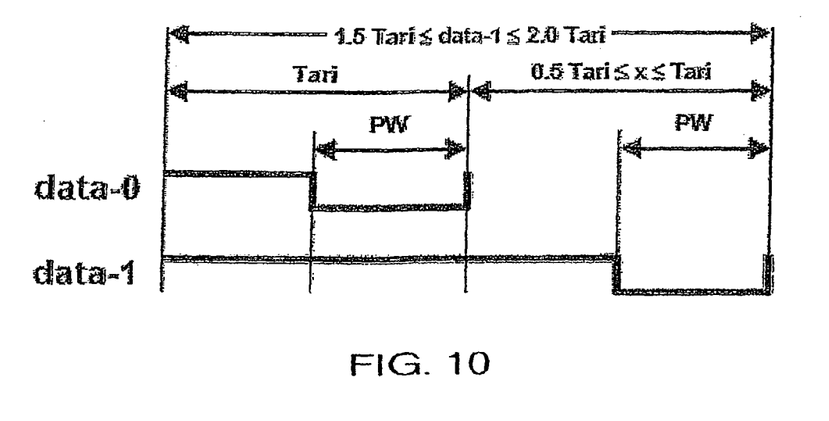
FIG. 10 is a view illustrating an effect of a 0-1 inversion format in the data compression/decompression unit.
Figure 11:
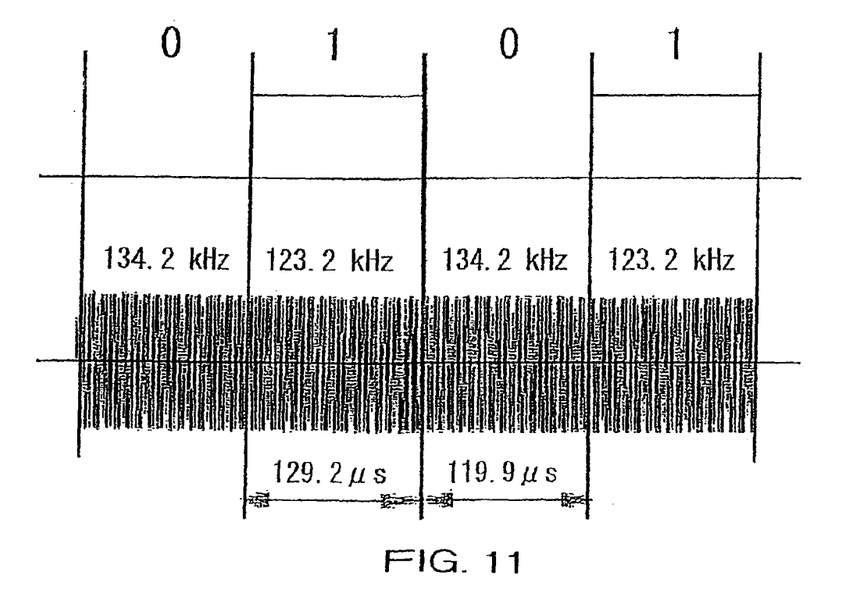
FIG. 11 is a view illustrating an effect of a 0-1 inversion format in the data compression/decompression unit.

Examples of the data compression/conversion in the data compression/decompression unit 22 will be described with reference to FIG. 8 to FIG. 11. FIG. 8 is a view illustrating the case where the data is compressed in an LZH format, and FIG. 9 to FIG. 11 are views illustrating the case where the data is converted in a compression format (hereinafter referred to as a "0-1" inversion format) in which "0" and "1" are inverted.

The case where the data is compressed in the LZH format will be described below. In FIG. 8, data 801 illustrates the state before the data is compressed, and data 802 illustrates the state after the data is compressed in the LZH format. The data 801 has the data amount of 512 bytes before the compression, and the data 802 has the data amount of 68 bytes after the compression. The data amount can be reduced by about 87% by compressing the data in the LZH format. Therefore, the communication time between the RFID reader/writer 1 and the RFID tag 3 can be shortened, and the improvement of memory usage can be achieved in the RFID tag 3.

The case where the data is converted in the 0-1 inversion format will be described below. In the 0-1 inversion format, the numbers of appearance times of "0" and "1" are computed in a bit string of the data that becomes the conversion target, the data is directly used when the number of appearance times of "0" is more than that of "1", and the data in which "0" and "1" are replaced with each other is used when the number of appearance times of "1" is more than that of "0". In the embodiment, the data is converted in the 0-1 inversion format in units (16 bits) in which the command is transmitted from the RFID reader/writer 1 to the RF1D tag 3. The 0-1 inversion format can be applied when the communication between the RFID reader/writer 1 and the RFID tag 3 is conducted in a UHF band.

Figure 9A:
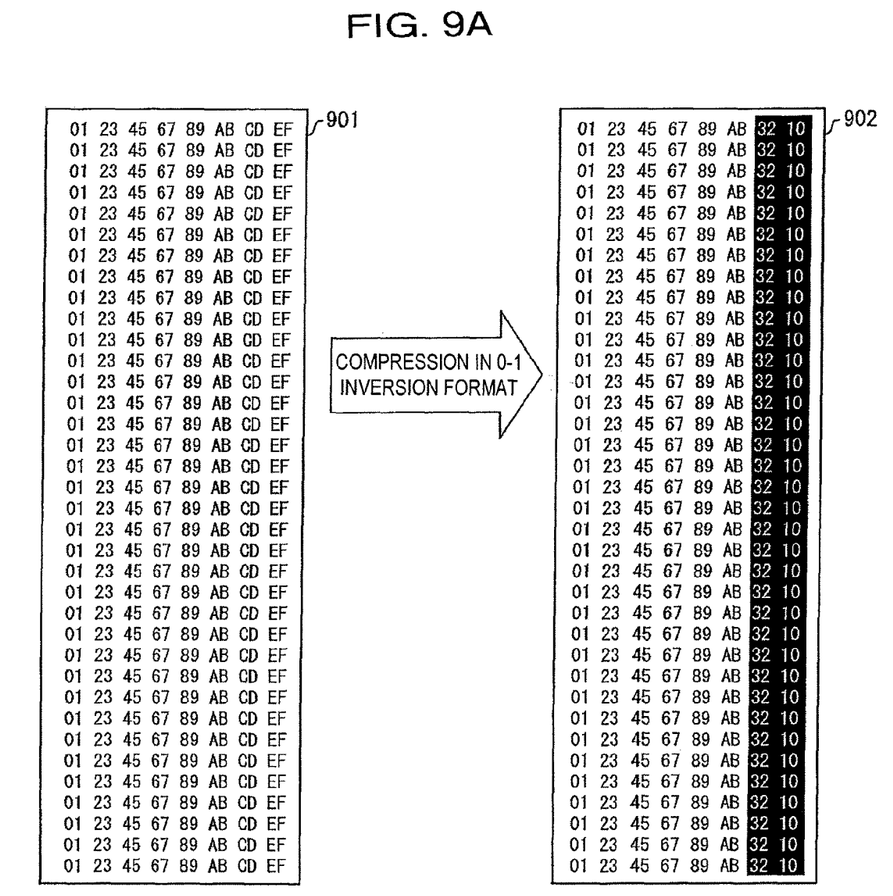
FIG. 9 is an explanatory view of data compression in the data compression/decompression unit of the RFID reader/writer of the embodiment.
Figure 9B:
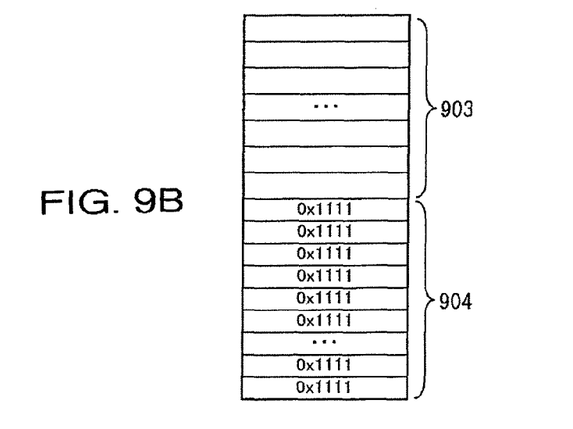

In FIG. 9A, data 901 illustrates the state before the data is converted, and data 902 illustrates the state after the data is converted in the 0-1 inversion format. FIG. 9B illustrates a structure of the memory 35 when the data is converted in the 0-1 inversion format. As illustrated in FIG. 9B, when the data is converted in the 0-1 inversion format, the memory 35 includes a converted data write area 903 in which converted data is written and a conversion information flag write area 904 in which the data indicating conversion information is written. A conversion information flag is written pursuant to a write protect method of an HF (High Frequency) instrument.

When the data is converted in the 0-1 inversion format, although both in the data 901 before the conversion and the data 902 after the conversion have the same data amount of 512 bytes, the communication time between the RFID reader/writer 1 and the RFID tag 3 is improved by about 10%. The reason will be described with reference to FIG. 10 and FIG.

11. FIG. 10 illustrates symbol times of the data "0" and data "1" in the UHF band. As illustrated in FIG. 10, the data "0" has the symbol time of 1 Tari (Type A Reference Interval) while the data "1" has the symbol time of 1.5 to 2.0 Tani. Therefore, it is found that the data "1" is shorter than the data "0" in the transmission time.

FIG. 11 illustrates transmission times of the data "0" and data "1" in an LF band. As illustrated in FIG. 11, the data "0" has a frequency of 134.2 KHz and the transmission time of 119.9 µs, while the data "1" has the frequency of 123.2 KHz and the transmission time of 129.2 µs. Therefore, it is found that the data "0" is shorter than the data "1" in the transmission time.

As described above, the data is converted in the 0-1 inversion format, and the data is converted into the data in which "0" and "1" are replaced with each other when the data is directly used when the number of appearance times of "1" is more than that of "0", so that the data transmission time (the time necessary to transmit the data from the RFID reader/writer 1 to the RFID tag 3 and the time necessary to receive the data from the RFID tag 3 to the RFID reader/writer 1) can be shortened. Because a computing processing load is lighter than that of the compression/decompression method, the data transmission time can be shortened in this regard.

The 0-1 inversion format is not limited to the data "0" and data "1", but the 0-1 inversion format can be applied when information transmission time necessary to transmit one of pieces of information is different from information transmission time necessary to transmit the other piece of information.

The RFID reader/writer 1 that can convert the data in the 0-1 inversion format and the RFID reader/writer 1 that cannot convert the data in the 0-1 inversion format are disposed in the processes, and the data can be converted in the 0-1 inversion format only in the process in which the communication between the RFID reader/writer 1 and the RFID tag 3 is conducted, which allows the 0-1 inversion format to be used in process management.

When the unique data compression method is adopted, the compressed data cannot be read and decompressed by an apparatus except the apparatus that compresses the data. Therefore, safety of the data written in the RFID tag 3 is enhanced to improve security in the communication system between the RFID reader/writer 1 and the RFID tag 3.

When a transmission rate from the RFID reader/writer 1 to the RFID tag 3 is different from a reception rate from the RFID tag 3 to the RFID reader/writer 1, the transmission/reception time is computed from the transmission rate and the reception rate, an information transmission/reception time necessary to transmit and receive one of pieces of information is compared to an information transmission/reception time necessary to transmit and receive the other piece of information, and the data may be converted so as to achieve the shorter transmission/reception time.

The disclosure is not limited to the embodiment, but various modifications can be made without departing from the scope of the disclosure. That is, an embodiment obtained by a combination of technical means appropriately changed within a range of claims is also included in the technical scope of the disclosure.

Finally, each block of the RFID reader/writer 1 and RFID tag 3, particularly the controller 10 (tag controller 21, data compression/decompression unit 22) and wireless processing unit 12 of the RFID reader/writer 1 and the controller 34 of the RFID tag 3 may be implemented by a logic circuit formed on an integrated circuit (IC chip) in a hardware manner or may be implemented in a software manner using a CPU (Central Processing Unit).

In the latter, the RFID reader/writer 1 and the RFID tag 3 include the CPU that executes a command of a control program implementing each function, the ROM (Read Only Memory) in which the program is stored, the RAM (Random Access Memory) in which the program is expanded, and the storage device (recording medium) such as a memory in which the program and various pieces of data are stored. Program codes (an executable format program, an intermediate code program, and a source program) of the control programs that are of the software implementing the functions in the RFID reader/writer 1 and RFID tag 3 are recorded in the computer-readable recording medium, the recording medium is supplied to the RFID reader/writer 1 and the RFID tag 3, and the computers (or the CPU or MPU (Microprocessor Unit)) of the RFID reader/writer 1 and RFID tag 3 read and execute the program code recorded in the recording medium, which allows objects of the disclosure to be achieved.

Examples of the recording medium include tape system such as magnetic tape and cassette tape, disk systems including magnetic disks such as floppy disk (registered trademark) and a hard disk and optical disks such as a CD-ROM (Compact Disc Read Only Memory), an MO (Magneto-Optical) an MD (Mini Disc), a DVD (Digital Versatile Disc), and a CD-R (CD Recordable), card systems such as an IC card (including a memory card) and an optical card, semiconductor memory systems such as a mask ROM, an EPROM (Erasable Programmable Read Only Memory), an EEPROM (Electrically Erasable Programmable Read Only Memory) and a flash ROM, and logic circuits such as a PLD (Programmable Logic Device) and an FPGA (Field Programmable Gate Array).

The RFID reader/writer 1 and the RFID tag 3 are configured to be able to be connected to a communication network, and the program code may be supplied through the communication network. There is no particular limitation to the communication network as long as the program code can be transmitted through the communication network. Examples of the communication network include the Internet, an intranet, an extranet, a LAN (Local Area Network), an ISDN (Integrated Services Digital Network), a VAN (Value-Added Network), a CATV (Community Antenna Television), a virtual private network, a telephone line network, a mobile communication network, and a satellite communication network. A transmission medium constituting the communication network is not limited to a specific configuration or a specific kind as long as the transmission medium can transmit the program code. Examples of the transmission medium include wired lines such as IEEE (Institute of Electrical and Electronic Engineers) 1394, a USB, a power-line carrier, a cable TV line, a telephone line, and an ADSL (Asynchronous Digital Subscriber Loop) line and wireless lines such as infrared ray such as IrDA (Infrared Data Association) and a remote controller, Bluetooth (registered trademark), IEEE 802.11 wireless, HDR (High Data Rate), NFC (Near Field Communication), DLNA (Digital Living Network Alliance), a mobile telephone network, a satellite line, and a terrestrial digital network.

Because the data can be transmitted to the RFID tag while compressed, the disclosure is suitable to the tag communication apparatus that transmits the information having the large data amount to the RFID tag.

What is claimed is:

1. A tag communication apparatus configured to conduct wireless communication with an RFID tag through a radio wave, the tag communication apparatus comprising:
   a data receiver that receives transmit data to be transmitted to the RFID tag;

a data compressor that compresses at least a part of the received transmit data and outputs compressed data;
a storage space information generator that generates storage space information in which a storage space in a storage of the RFID tag is correlated with stored information; and
a transmitter that transmits the compressed data and the storage space information to the RFID tag,
wherein in a communication format in which one of a bit information transmission time necessary to transmit pieces of bit information comprising a data bit string is longer than an other of a bit information transmission time,
wherein the data compressor counts the number of times of appearance of bits of the data bit string in the transmit data,
wherein the data compressor outputs the transmit data when the number of times of appearance of a bit having the shorter bit information transmission time is more than that of a bit having the longer bit information transmission time, and
wherein the data compressor generates and outputs converted data in which the bits of the data bit string in the transmit data are inverted when the number of times of appearance of the bit having the longer bit information transmission time is more than that of the bit having the shorter bit information transmission time.

2. The tag communication apparatus according to claim 1, wherein the data receiver receives a plurality of pieces of transmit data,
wherein the data compressor compresses the plurality of pieces of transmit data obtained by the data receiver and outputs each piece of compressed data,
wherein the storage space information generator generates compressed data space information associating the each piece of compressed data with the space where the each piece of compressed data is stored in the storage of the RFID tag, and
wherein the transmitter transmits the each piece of compressed data output from the data compressor and the compressed data space information produced by the storage space information generator to the RFID tag.

3. The tag communication apparatus according to claim 2, further comprising:
an available space determiner that determines whether an available space exists in the storage of the RFID tag where the each piece of compressed data can be stored; and
a space shortage information transmitter that transmits space shortage information to a source device indicating a lack of available space for the transmit data obtained by the data receiver, when the available space determiner determines that available space does not exist.

4. The tag communication apparatus according to claim 1, further comprising:
a compressed data receiver that receives the compressed data from the RFID tag; and
a data decompressor that decompresses the compressed data received by the compressed data receiver.

5. The tag communication apparatus according to claim 2, further comprising:
a compressed data receiver that receives requested compressed data from the RFID tag; and
a data decompressor that decompresses the requested compressed data received by the compressed data receiver,
wherein the compressed data receiver receives the requested compressed data from the RFID tag using the compressed data space information.

6. A method for controlling a tag communication apparatus that conducts wireless communication with an RFID tag through a radio wave, the method comprising:
obtaining transmit data to be transmitted to the RFID tag;
compressing at least a part of the transmit data;
outputting the compressed data;
generating storage space information in which a storage space in a storage of the RFID tag is correlated with stored information; and
transmitting the compressed data and the storage space information to the RFID tag,
wherein in a communication format in which one of a bit information transmission time necessary to transmit pieces of bit information comprising a data bit string is longer than an other of a bit information transmission time,
wherein the compressing comprises counting the number of times of appearance of bits of the data bit string in the transmit data,
wherein the compressing comprises outputting the transmit data when the number of times of appearance of a bit having the shorter bit information transmission time is more than that of a bit having the longer bit information transmission time, and
wherein the compressing comprises generating and outputting converted data in which the bits of the data bit string in the transmit data are inverted when the number of times of appearance of the bit having the longer bit information transmission time is more than that of the bit having the shorter bit information transmission time.

7. A non-transitory computer readable medium storing a computer program that operates a tag communication apparatus to conduct wireless communication with an RFID tag through a radio wave, the program causing a computer to execute:
receiving transmit data to be transmitted to the RFID tag;
compressing at least a part of the transmit data;
outputting the compressed data;
generating storage space information in which a storage space in a storage of the RFID tag is correlated with stored information; and
transmitting the compressed data and the storage space information to the RFID tag,
wherein in a communication format in which one of a bit information transmission time necessary to transmit pieces of bit information comprising a data bit string is longer than an other of a bit information transmission time,
wherein the compressing comprises counting the number of times of appearance of bits of the data bit string in the transmit data,
wherein the compressing comprises outputting the transmit data when the number of times of appearance of a bit having the shorter bit information transmission time is more than that of a bit having the longer bit information transmission time, and
wherein the compressing comprises generating and outputting converted data in which the bits of the data bit string in the transmit data are inverted when the number of times of appearance of the bit having the longer bit information transmission time is more than that of the bit having the shorter bit information transmission time.

* * * * *